United States Patent [19]

Higgins

[11] Patent Number: 5,374,086
[45] Date of Patent: Dec. 20, 1994

[54] BALL JOINT SEAL FOR VEHICLE EXHAUST SYSTEM

[75] Inventor: Kenneth T. Higgins, Metamora, Mich.

[73] Assignee: Creative Industries Group, Inc., Auburn Hills, Mich.

[21] Appl. No.: 922,433

[22] Filed: Jul. 29, 1992

[51] Int. Cl.⁵ .............................................. A16L 17/08
[52] U.S. Cl. ..................................... 285/111; 285/368; 285/422; 285/917; 285/49
[58] Field of Search ................ 285/187, 917, 261–271, 285/368, 422, 49, 111; 277/26, 61, 189, 205, 206, 233, 236

[56] References Cited

U.S. PATENT DOCUMENTS

| | | |
|---|---|---|
| Re. 33,199 | 4/1990 | Karr, Jr. . |
| 586,176 | 7/1897 | Gorter . |
| 642,853 | 2/1900 | Simmons .............................. 285/264 |
| 859,165 | 7/1907 | Boswell . |
| 1,132,123 | 3/1915 | Royer et al. . |
| 1,938,035 | 12/1933 | Mann . |
| 1,949,055 | 2/1934 | Lambie . |
| 2,067,768 | 1/1937 | Krefft . |
| 2,165,052 | 7/1939 | Hering . |
| 2,211,983 | 8/1940 | Parris . |
| 2,303,114 | 11/1942 | Egger . |
| 2,303,642 | 12/1942 | Hoy . |
| 2,312,909 | 3/1943 | Jeffery ..................................... 277/26 |
| 2,422,009 | 6/1947 | Goetze . |
| 2,519,147 | 8/1950 | Miller . |
| 2,652,282 | 9/1953 | Willetts . |
| 2,773,709 | 12/1956 | Smith .................................... 285/187 |
| 2,874,978 | 2/1959 | Stilwell . |
| 3,042,248 | 4/1958 | Krueger . |
| 3,046,026 | 10/1958 | Burrows . |
| 3,058,750 | 10/1962 | Taylor . |
| 3,165,339 | 1/1965 | Fallow ................................... 285/263 |
| 3,207,524 | 9/1965 | Trbovich . |
| 3,334,927 | 8/1967 | Fallow ................................. 277/26 X |
| 3,411,812 | 11/1968 | Prince et al. ......................... 285/187 |
| 3,632,143 | 1/1972 | Lessmann ............................ 285/187 |
| 3,759,552 | 9/1973 | Levinsohn et al. . |
| 4,132,437 | 2/1979 | Green . |
| 4,175,754 | 11/1979 | Wilhelm . |
| 4,452,462 | 6/1984 | Karr, Jr. . |
| 4,537,280 | 8/1985 | Roberts . |
| 4,553,775 | 11/1985 | Halling . |
| 4,597,596 | 7/1986 | Tozer . |
| 4,626,002 | 12/1986 | Hagemeister . |
| 4,779,901 | 10/1988 | Halling . |
| 4,840,409 | 6/1989 | Welkey . |
| 4,871,181 | 10/1989 | Usher et al. ..................... 285/268 X |
| 4,877,272 | 10/1989 | Chevallier et al. . |
| 4,906,027 | 3/1990 | DeGruijter . |
| 4,915,397 | 4/1990 | Nicholson . |
| 5,050,843 | 9/1991 | Brooks . |
| 5,050,914 | 9/1991 | Miyashita . |

FOREIGN PATENT DOCUMENTS 595332 9/1925 France ................................. 285/917

Primary Examiner—Dave W. Arola
Attorney, Agent, or Firm—Edgar A. Zarins; Malcolm L. Sutherland

[57] ABSTRACT

A seal for the articulating ball joint of a vehicle exhaust system to prevent exhaust leakage. Vehicle exhaust systems include several connected sections to direct exhaust from the engine through the catalytic converter and out the tail pipe. At least one articulating ball joint is included to compensate for vibrational movement between the engine and the exhaust system. The joint seal of the present invention incorporate a bi-metal body with a first end secured to a portion of the clamp assembly and a second end which seals the gap between the members of the ball joint to prevent exhaust leakage therebetween.

8 Claims, 1 Drawing Sheet

BALL JOINT SEAL FOR VEHICLE EXHAUST SYSTEM

BACKGROUND OF THE INVENTION

I. Field of the Invention

This invention relates to a seal for connected sections of a vehicle exhaust system and, in particular, to a seal for the articulating ball joint of an exhaust system to eliminate leakage of exhaust.

II. Description of the Prior Art

In order to compensate for vibrations of the vehicle and thermal expansion, vehicle exhaust systems are typically constructed and mounted in segments. This also reduces costs in the event a section of the exhaust system requires replacement. The joints between segments are clamped together to allow for varying rates of thermal expansion and the vibrations of the vehicle. Typically, a section of exhaust pipe is matingly received within a the joint. In the past, exhaust leakage at such joints was not a concern since it was believed to be minimal and substantially ended up in the atmosphere along with the majority of the exhaust gases which travelled through the exhaust system.

With the advent and improvement of emission control systems, it has become advantageous to direct as much of the exhaust gases as possible through such emission devices. Additionally, federally mandated vehicle emission standards will require the elimination of exhaust leakage from the gas exit at the head port of the engine to aft of the catalytic converter or other emission control device. Such mandates causes the need for low pressure seal systems built of materials capable of withstanding high temperatures (950° C.), are resistant to corrosives such as sulfuric acid and road salt, and are durable. Prior attempts at sealing the joints of an exhaust system have not met such stringent standards.

SUMMARY OF THE PRESENT INVENTION

The present invention overcomes the disadvantages of the prior known exhaust systems by providing a seal for the articulating ball joint of such vehicle exhaust systems which does not retard the articulation of the joint.

The joint seal of the present invention is preferably formed of a pair of mating metal components to form the seal body. The seal includes a radial flange which is mounted to the clamp maintaining the joint or to the exterior pipe member which receives the other pipe section. A frusto-domical portion of the seal fills the gap between the mating spherical sections of the ball joint. In a preferred embodiment of the ball joint seal, the frusto-domical section includes a plurality of compression beads to fill any gap between the sections of the joint. In addition, the end of the frusto-domical section are flared thereby causing the bi-metal to spread for improved sealing.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the view and in which.

DETAILED DESCRIPTION OF A PREFERRED EMBODIMENT OF THE PRESENT INVENTION

Figure 1:
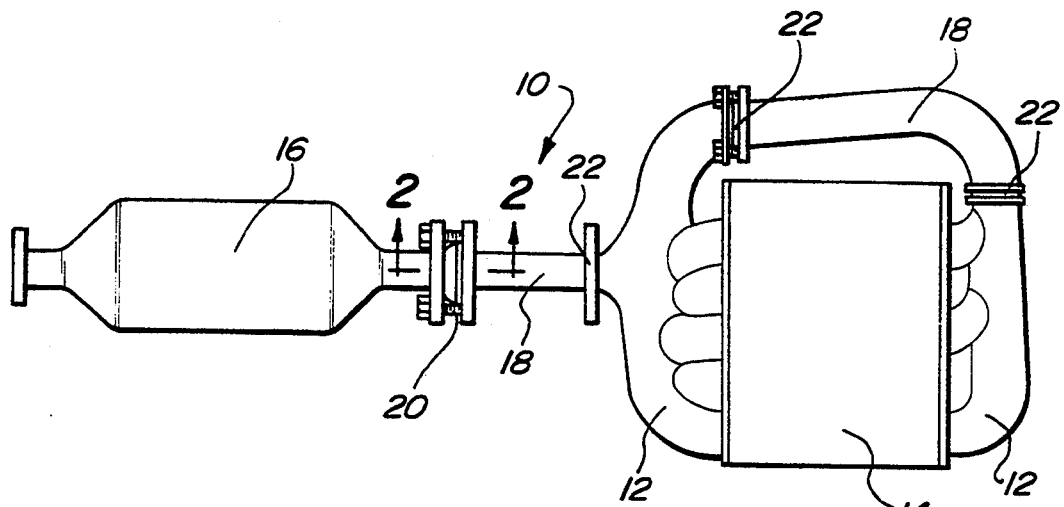
FIG. 1 is a plan view of a vehicle exhaust system embodying the joint seal of the present invention.

Referring first to FIG. 1, there is shown a simple vehicle exhaust system 10 including exhaust manifolds 12 connected to an engine 14 and designed to direct the flow of exhaust gases through an emission control device 16 such as a catalytic converter. The exhaust system 10 also typically includes additional segments of exhaust pipe 18 which are connected together to direct the flow of exhaust. The components of the exhaust system 10 are connected together at either articulating ball joints 20 in accordance with the present invention or linear joints 22 as described and claimed in copending application Ser. No. 07/921,885. In order to eliminate leakage of exhaust, each of these connector joints include seal elements. In the case of the articulating ball joint 20, seal means provided must not retard the freedom of movement within the joint.

Figure 2:
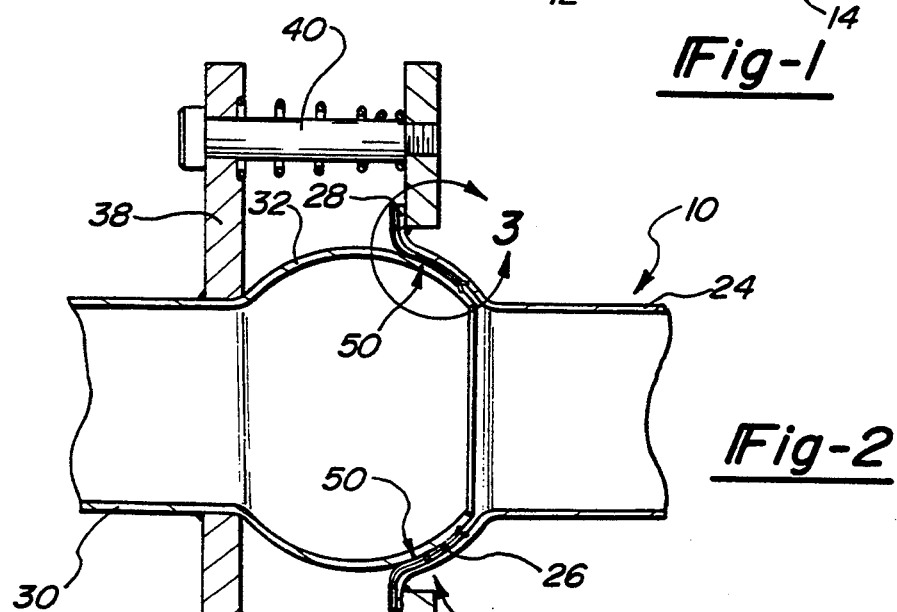
FIG. 2 is a cross-sectional view of an articulating ball joint of the exhaust system incorporating the joint seal of the present invention taken along lines 2—2 of FIG. 1.
Figure 3:
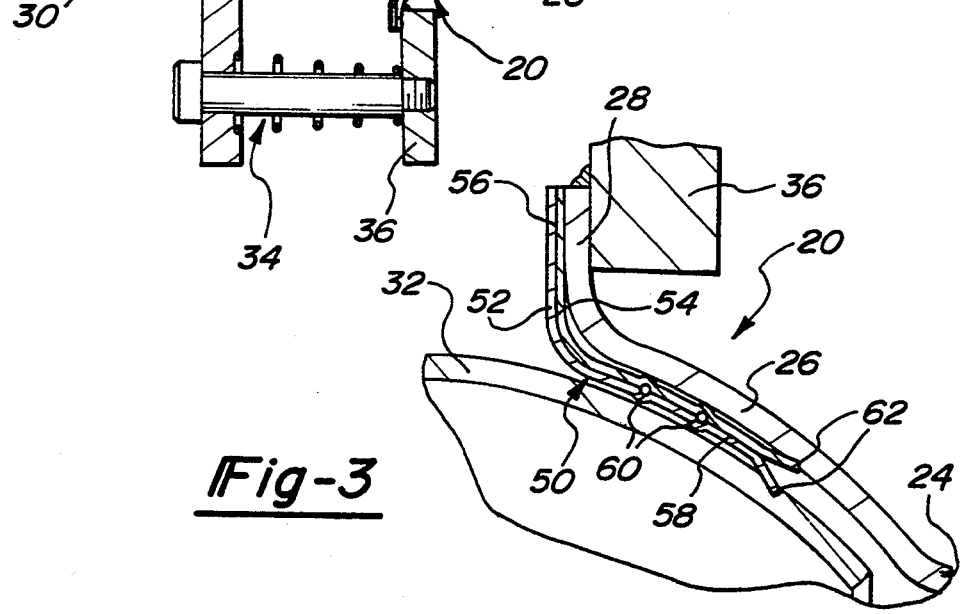
FIG. 3 is an enlarged cross-sectional view of circle 3.3 of FIG. 2 showing the joint seal of the present invention.

Referring now to FIGS. 2 and 3, the articulating ball joint 20 generally includes a first exhaust tube 24 having semi-spherical flange 26 formed in the end thereof. In a preferred embodiment, a radial flange 28 is also provided to facilitate clamping connection of the joint 20. Matingly received within the first exhaust tube 24 is a second exhaust tube 30 having a spherical housing 32 formed in the end thereof for matingly forming the ball joint with the semispherical flange 26. In response to vibrations and thermal expansion, the spherical housing 32 is free to articulate within the semispherical flange 26 of the first exhaust tube 24. In order to maintain mating connection of the first and second exhaust tubes, a clamping assembly 34 is provided. The clamping assembly 34 preferably comprises a first clamping ring 36 secured to the radial flange 28 of the first exhaust tube 24 and a second clamping ring 38 secured to the second exhaust tube 30. The clamping rings 36 and 28 are secured to their respective exhaust tubes by welding or other suitable connecting means. A plurality of fasteners 40 are provided for connecting the first clamping ring 36 to the second clamping ring 38. In order to facilitate articulation of the clamping assembly 34 and therefore the ball joint 20, the fasteners 40 include springs 42 for biasing the clamping rings away from each other thereby maintaining a uniform clamping tension.

In the prior known articulating ball joints, exhaust leakage occurred between the mating semispherical surfaces of the exhaust tubes. The present invention incorporates a bimetallic seal 50 within the gap between the mating surfaces to eliminate exhaust leakage. The joint seal 50 preferably is made of a pair of adjacently mounted or piggybacked metal plates 52 and 54. The seal 50 can comprise two pieces of formed metal joined together as an assembly and further may be either similar or dissimilar metals. The seal 50 generally conforms to the configuration of the semispherical 26 and radial 28 flanges of the first exhaust tube 24 and therefor includes a radial flange 56 and a frusto-domical portion 58. Formed in the frusto-domical portion 58 of the seal 50 is at least one compression bead 60 to fully fill the gap between the exhaust tubes. The ends 62 of the frusto-domical portion 58 of the seal 50 are flared away from each other so that sealing engagement is made with the respective exhaust tubes. Although a preferred embodiment contemplates forming the seal 50 of a bimetal creating sealing engagement with both the first exhaust tube 24 and the second exhaust tube 30, a single layer seal may be used incorporating compression beads 60 and a flared end 62 to seal the ball joint 20.

The ball joint seal 50 of the present invention provides a simple means of eliminating fluid leakage from the articulating ball joint 20 of a vehicle exhaust system 10. The ball joint seal 50 eliminates exhaust leakage while maintaining the freedom of thermal expansion and shock absorption between connected components. As internal pressure increases such pressure will force the bimetal components 52 and 54 apart at their flared ends 62 increasing the sealing engagement against the respective exhaust tubes. The compression beads 60 fill the gap between the components to provide additional means of preventing fluid leakage.

The foregoing detailed description has been given for clearness of understanding only and no unnecessary limitations should be understood therefrom as some modifications will be obvious to those skilled in the art without departing from the scope and spirit of the appended claims.

What is claimed is:

1. A seal for an articulating ball joint formed by first and second cooperating sections of an exhaust system, said first section including a first exhaust tube having a hemispherical end portion and a first clamping flange and a second exhaust tube having a semi-spherical end portion and a second clamping flange, the semi-spherical end of the second exhaust tube matingly received within the hemispherical end of the first exhaust tube and the first and second clamping flanges interconnected to connect said first section of said exhaust system to said second cooperating section of said exhaust system, said joint seal comprising:

an integral ring having a frusto-domical flange disposed between the semi-spherical end portion of said second exhaust tube and the hemispherical end portion of said first exhaust tube and a radial flange formed substantially perpendicular to said frusto-domical flange, said frusto-domical flange including at least one compression bead sealingly engaging said end portions of said first and second exhaust tubes preventing leakage of exhaust gases between said first and second cooperating sections of said exhaust system while maintaining freedom of articulating movement of said ball joint.

2. The seal as defined in claim 1 wherein said joint seal includes first and second metallic layers adjacently mounted to form said ring.

3. The seal as defined in claim 2 therein said joint seal is bimetallic, said first and second metallic layers having different thermal properties.

4. The seal as defined in claim 2 wherein end portions of said first and second metallic layers of said frusto-domical flange are flared apart from each other for sealing engagement with said first and second exhaust tubes respectively.

5. In a vehicle exhaust system having first and second cooperating sections for directing exhaust gases from the vehicle engine, the first section including a first exhaust tube having a hemispherical end portion and a first clamping flange mounted thereto and the second section including a second exhaust tube having a semi-spherical end portion and a second clamping flange, said semi-spherical end of the second exhaust tube matingly received within the hemispherical end of the first exhaust tube to form an articulating ball joint of the exhaust system, said first and second clamping flanges connected by a plurality of fasteners to connect said cooperating sections of said vehicle exhaust system, the improvement comprising:

a joint seal for preventing exhaust leakage between said mating end portions of said first and second exhaust tubes, said seal including a frusto-domical flange disposed between the semispherical end portion and the hemispherical end portion of said exhaust tubes to prevent exhaust leakage therebetween and a radial flange formed substantially perpendicular to said frusto-domical flange, said joint seal including at least one compression bead to fill the gap between said mating end portions preventing leakage of exhaust gases between said first and second cooperating sections of said exhaust system while maintaining freedom of articulating movement of said ball joint.

6. The seal as defined in claim 5 wherein said joint seal comprises first and second adjacent metallic layers said adjacent layers having flared apart end portions for sealing engagement with said first and second exhaust tubes.

7. The seal as defined in claim 6 wherein said at least one compression bead is formed in each layer of said joint seal forming a substantially tubular compression bead.

8. The joint seal as defined in claim 7 wherein said frusto-domical flange includes a pair of compression beads, said compression beads having a tubular construction formed by said first and second layers of the joint seal.

* * * * *